United States Patent [19]

Nelson

[11] Patent Number: 4,701,913

[45] Date of Patent: Oct. 20, 1987

[54] CIRCUIT AND METHOD FOR EXTRACTING SIGNALLING INFORMATION EMBEDDED IN CHANNELIZED SERIAL DATA STREAMS

[75] Inventor: Paul G. Nelson, Carrollton, Tex.

[73] Assignee: Northern Telecom Limited, Montreal, Canada

[21] Appl. No.: 872,841

[22] Filed: Jun. 11, 1986

[51] Int. Cl.$^4$ .................... H04J 3/12

[52] U.S. Cl. .................... 370/110.1

[58] Field of Search .................... 370/83, 82, 94, 110.1, 370/68.1, 105

[56] References Cited

U.S. PATENT DOCUMENTS 4,002,846 1/1977 Barbier .................... 370/110.1

4,135,060 1/1979 Heckel et al. .................... 370/110.1

4,627,047 12/1986 Pitroda et al. .................... 370/110.1

FOREIGN PATENT DOCUMENTS 2135155 8/1984 United Kingdom .................... 370/68.1

*Primary Examiner*—Douglas W. Olms

*Assistant Examiner*—James E. Busch

*Attorney, Agent, or Firm*—Schwartz, Jeffery, Schwaab, Mack, Blumenthal & Evans

[57] ABSTRACT

The circuit comprises a serial to parallel converter for extracting the signalling bits from the various channels of the data streams and for providing a serial stream of signalling bits, and a read-write memory having a plurality of locations at least as large as the number of channels in the data streams, each location having at least the number of cells necessary to store a byte of signalling data and the signalling message header. The converter outputs the signalling bits from consecutive channels of the data streams into a one-byte shift register adapted to shift the bits laterally as well as receive and output a byte of data in parallel from and unto a bus connected to memory. A control circuit is responsive to clock signals for providing timing control signals whereby for each signalling bit outputted from the serial to parallel converter, the memory location associated with the channel of that bit is read into the shift register, the signalling bit is shifted laterally into the register and its contents is written back into the memory. On the last bit of each byte of the signalling message, that byte is fed to an output buffer and then to a message handler circuit. There is included, circuitry for recognizing a signalling message header, full bytes of signalling data and the end of a signalling message.

14 Claims, 5 Drawing Figures

CIRCUIT AND METHOD FOR EXTRACTING SIGNALLING INFORMATION EMBEDDED IN CHANNELIZED SERIAL DATA STREAMS

The invention relates generally to digital switching systems and more particularly to a circuit and method for demultiplexing signalling bits embedded in channelized serial data streams.

BACKGROUND OF THE INVENTION

Contemporary telecommunication systems are increasingly digital in nature. That is, switching systems convert received analog information into digital data to perform their function and/or are adapted to receive digital data from various sources. It is increasingly common to connect peripheral equipment such as integrated voice-data sets to such systems using a data link carrying a time-multiplexed digital data stream. The data stream is usually channelized with each channel containing a plurality of bits, some of which are used for digitized pulse code modulated (PCM) speech or user digital data and others of which are used for signalling between the terminal and the switching sytems.

One common serial channelized data stream is known as DS-30X formatted data. It uses a 2.56 Mb/s data link whose format comprises a frame having 32 channels each of ten bits. Eight of the bits are used for PCM speech or user digital data, one bit is variously used for special control signals and one bit is used as a signalling bit. With a frame period of 125 microseconds the eight bits provide a clear 64 kb/s channel between the user terminal and the switching system whereas the one signalling bit provides an 8 kb/s signalling channel.

The signalling channel created by the signalling bit from each channel is only needed occasionally, as for example when a user dials a digit at the particular terminal associated with that channel. When the signalling channel is not transmitting intelligence, the binary level of the pulse in that bit time slot is repeatedly maintained at one level, typically a binary 1 (ONE) or so-called marking voltage level, for all the frames during the idle interval. When a terminal has a signalling message to send, it transmits a binary pattern which is not all binary 1's to indicate the beginning of a message. It is also desirable that the terminal informs the receiving circuit of the length of the message to expect. The header of a signalling message may therefore comprise a start message, for example a zero bit followed by three length bits which express the length of the message as a value from zero to seven. Of course, any combination of bits may be used as the signalling message header.

It is therefore a requirement for the data receiving equipment at the switching office to be able to partition the received data stream into the separate channels and strip out the signalling bits from the channels so that the signalling message may be recognized and acted upon.

An object of this invention is to provide a system for receiving variable length signalling messages embedded in a serial channelized data stream wherein the message extraction circuitry comprises a storage device which needs to be only large enough to store one byte of signalling message.

It is another object of this invention to provide a single message extraction and data handler circuit for extracting signalling data from a plurality of data streams received simultaneously.

SUMMARY OF THE INVENTION

In accordance with the invention there is provided a demultiplexer circuit for extracting variable length signalling messages embedded in a channelized serial data stream having a frame format comprising a plurality of channels each having a plurality of bits one of which is a signalling bit, the signalling message format comprising a signalling message header having a start bit and a length field defining the number of bytes in the message. The circuit comprises a serial to parallel converter circuit responsive to the serial data stream for sequentially outputting the signalling bits from consecutive channels of the data stream and a read-write memory having a plurality of locations at least as large as the number of channels in a frame of the serial data stream, each location having at least the number of cells necessary to store a byte of signalling data and the bits of the length field in the signalling message header as well as a circuit for providing a clock signal for every channel time. A first shift register is connected to receive the signalling bits from the channels of data, for serially outputting a bit for each signalling bit received and for outputting in parallel to the memory a byte of signalling bits. A control circuit includes a second register adapted to receive serial data from the first register and output its content in parallel to the memory. The control circuit is responsive to the content of the second register for recognizing a signalling message header, full bytes of signalling data and end of signalling message. The control circuit also includes a sequencer circuit responsive to the signals from the clock circuit for providing timing control signals whereby for each signalling bit outputted from the serial to parallel converter, the memory location associated with the channel of that bit is read into the first register, the signalling bit is shifted into the first register and the contents of the first register is written back into the memory.

From another aspect, the invention relates to a method of extracting signalling messages embedded in a channelized serial data stream. The signalling bit from every channel in the serial data stream are isolated and fed to a register. For every signalling bit the contents of a memory location associated with the channel from which the signalling bit is extracted is fed to a register, the extracted bit is shifted into the register, and the content of the register is fed back into the memory at the location associated with the channel from which the signalling bit was extracted. On the last bit of each byte of the signalling message, that byte is fed to an output buffer and thence to a message handler circuit.

DESCRIPTION OF THE INVENTION

An example embodiment of the invention will now be described in conjunction with the drawings in which.

GENERAL DESCRIPTION

Figure 1:
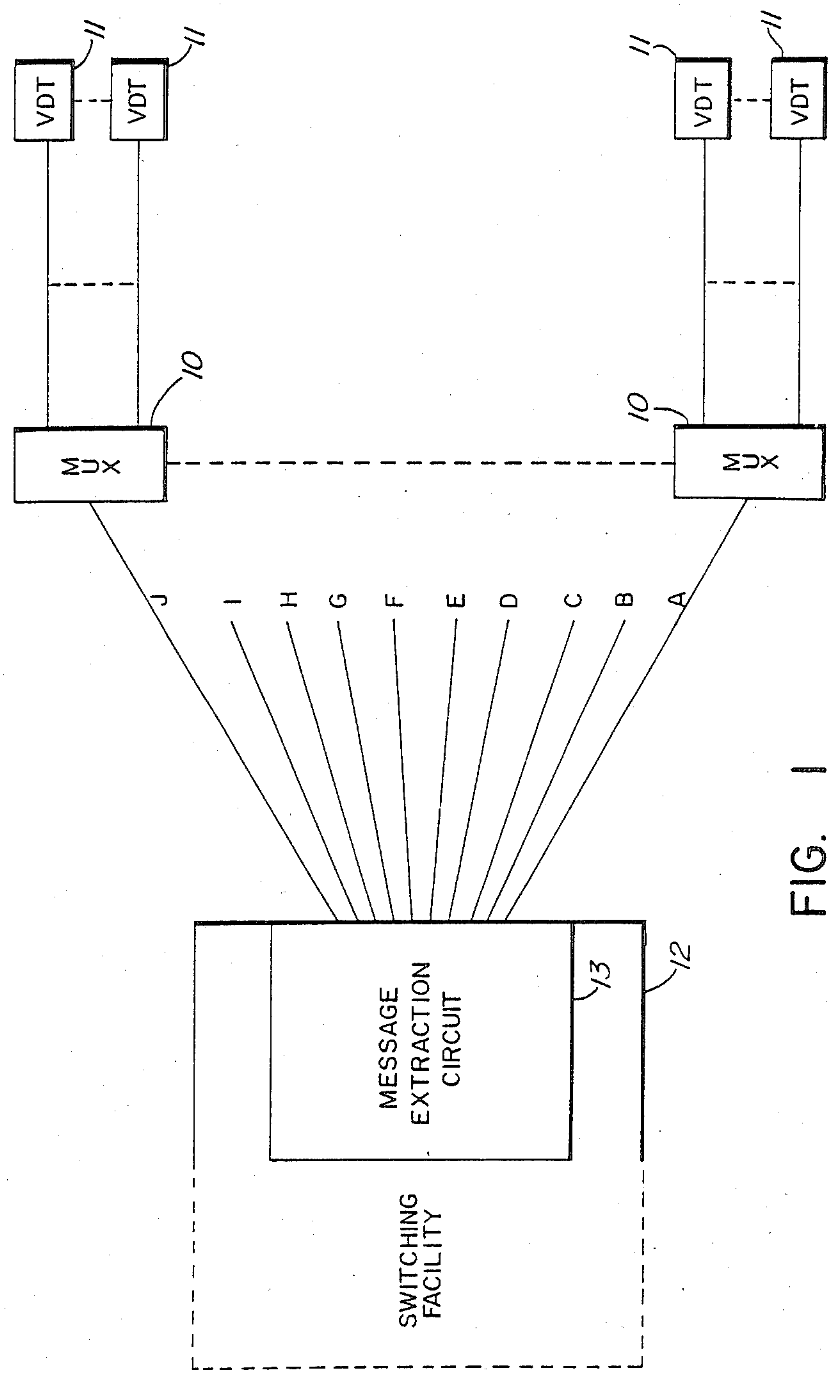
FIG. 1 is a block diagram illustrating the use of the circuit of the invention in a telephone switching system.

FIG. 1 shows a plurality of multiplexers 10 each connected to a plurality of subscriber apparatus such as voice-data terminals 11. The multiplexers 10 receive the data from the terminals 11 and multiplex it into channelized serial data streams A,B,C,D,E,F,G,H,I,J for transmission to a switching facility 12 comprising a message extraction circuit 13.

Figure 2A:
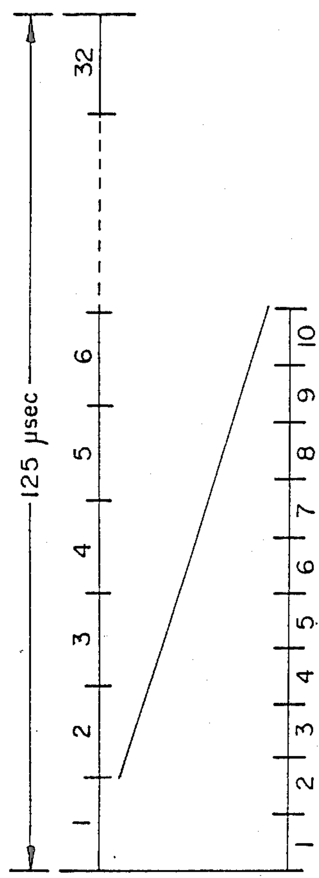
FIG. 2A is a diagram illustrating a multiplexing data transmission format and FIG. 2B illustrates a signalling message format.
Figure 2B:
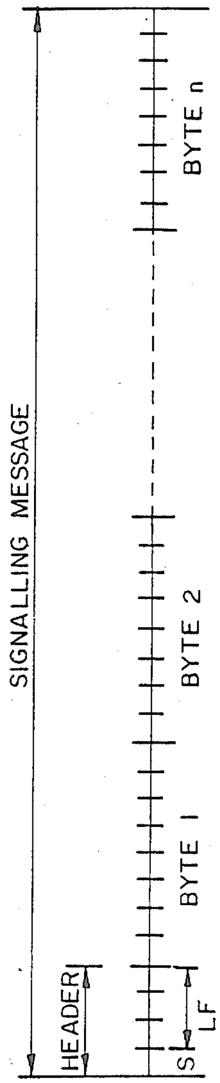

FIG. 2A illustrates the data format on the links A–J. Each link carries data in a frame format of 32 channels, each channel comprising 10 bits. The first 8 bits of each channel represent pulse code modulated (PCM) voice or user data; the ninth bit may be used as a control bit whereas the tenth bit is used as a signalling bit between the terminals 11 and the switching facility 12. For a frame time period of 125 microseconds, each bit represents an 8 Kb/s channel; hence the first eight bits of each channel represent a 64 Kb/s clear channel between terminals 11 and the switching facility. Similarly, the tenth bit provides an 8 Kb/s signalling channel. FIG. 2B illustrates the format of a signalling message embedded in the channelized data stream of FIG. 2A. As is common in the art, the signalling data is preceded by a start-of-message bit (zero bit) and length-of-message field (LF) followed by the signalling bytes. The signalling message in a channel is comprised of the tenth bits of that channel in consecutive frames. In this case the length-of-message field is three bits long representing one to eight bytes of signalling data and each signalling byte is eight bits in length. Of course, the start-of-message header and the signalling bytes may be of any predetermined length. In the described embodiment, the message extraction circuit is shared among 320 voice-data terminals 11.

Figure 3:
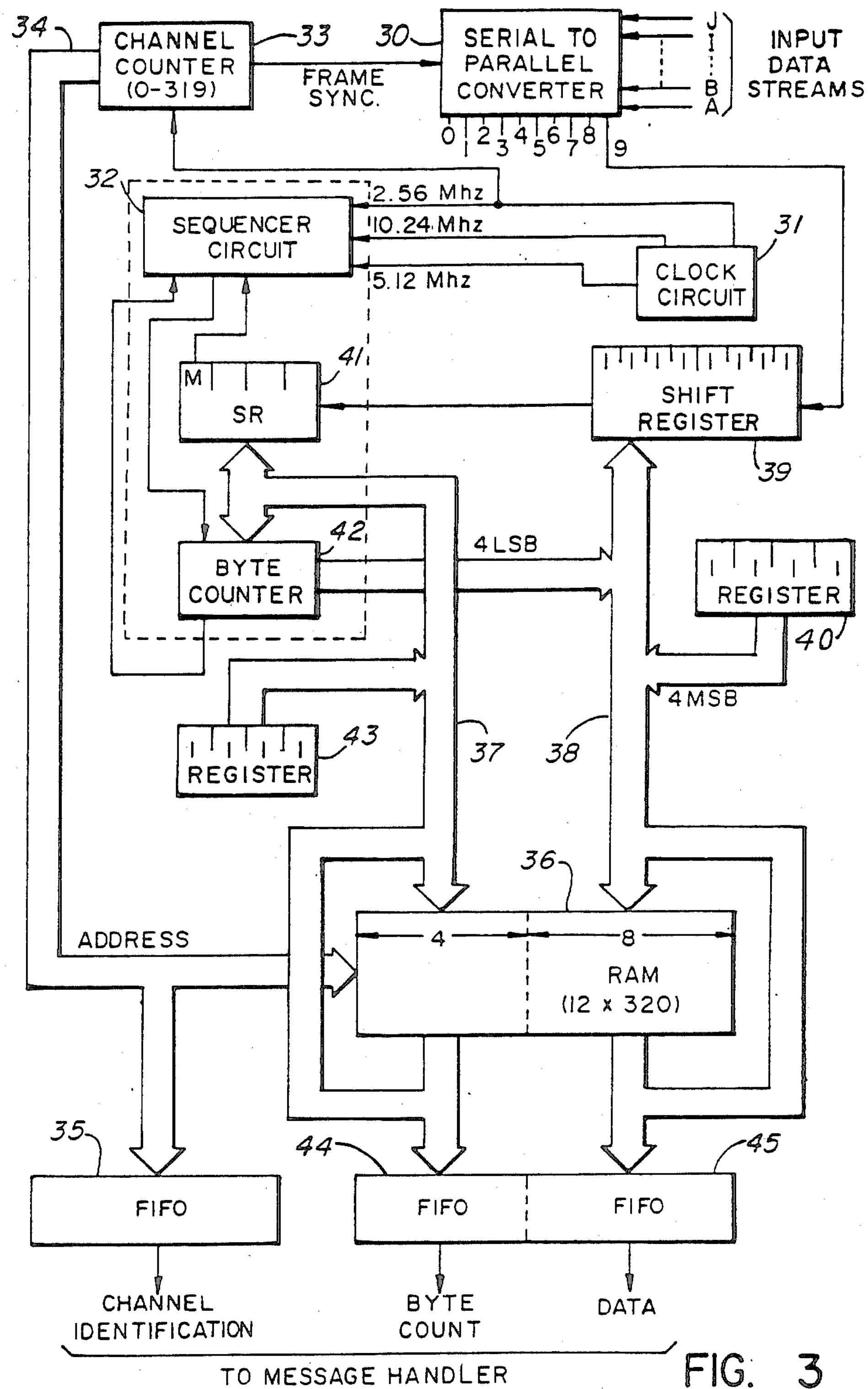
FIG. 3 is a block logic diagram of a signalling data extraction circuit in accordance with the invention.

FIG. 3 is a logic block diagram of a circuit embodying the invention. A converter circuit 30 is connected to a plurality of input terminals from which it receives serial data streams A,B,C,D,E,F,G,H,I,J having the format described in FIG. 2. The converter which may be of a type commercially available is adapted to simultaneously receive a plurality of streams of serial data and convert them to parallel data which is available on output terminals 0 to 9. The signalling bit from each channel is thus available on terminal 9. For each channel of data from the ten 2.56 Mb/s streams, the output from the signal bit line will scan through the first channel of each stream in the order A to J. This series of 10 signalling bits from ten different channels is followed by the 10 signalling bits from the next channel of each stream. If the 32 channels in each frame are numbered in time order from 0 through 31 inclusive, the significance of the signalling bits emerging from output terminal 9 of the converter 30 is as follows: A0,B0,C0, D0 . . . J0, A1,B1,C1,D1, . . . J1, A2,B2,C2,D2 . . . J2, A3,B3,C3, D3 . . . J3, . . . A31,B31,C31,D31 . . . J31. In each symbolic label, the letter represents the identification of the stream and the number represents the channel from which the signalling bit is derived. Therefore, a total of 320 distinct signalling bits are extracted from the data streams A-J during each 125 microsecond frame. The remainder of the circuit of figure 3 serves to manipulate these signalling bits whereby a message handler circuit receives bytes of signalling data together with channel identification data with each byte. Thus, the circuit is adapted to recognize a start of signalling message header, accumulate the signalling data of the message and output the latter one byte at a time as soon as it is extracted from the data streams.

A clock circuit 31 is adapted to provide 10.24 MHz, 5.12 MHz. and 2.56 MHz clock signals to a sequencer circuit 32 which is adapted to generate timing signals to the various components of FIG. 3. Sequencer circuit 32 receives event indications from the circuit and logically combines these with the clock signals to generate the required control signals. The circuit 32 therefore comprises a plurality of logic gates interconnected to achieve the control functions; the actual interconnections of the gates are not shown as these may readily be determined from the required control functions discussed below and those illustrated in the waveform timing diagram of FIG. 4.

A channel counter 33 is responsive to 2.56 MHz clock signals to provide frame sync signals to the converter 30 and channel counts from 0 to 319 on 9-bit bus 34 connected to a first-in-first-out (FIFO) buffer 35 and to a read-write (RAM) memory 36. The bus 34 provides the address for the RAM 36 which is adapted to receive and output data from and to buses 37 (4-bits) and 38 (8-bits). The RAM 36 contains 320 locations each containing 12 bits. The output terminal 9 of converter 30 is connected to a shift register 39 adapted to receive and output serial bits as well as receive and output parallel bytes of data from and to bus 38. The latter is also connected to static register 40 which serves as a source of all-one bits into the most significant nibble of bus 38, and to a decrementing four-bit byte counter 42. At the boundary of each byte of signalling data, the counter 42 decrements the value of the message header by one count and its output provides the start bit and decremented length field for the next byte of signalling data in that channel. An output of the counter 42 is connected to the least significant nibble of bus 38.

Figure 4:
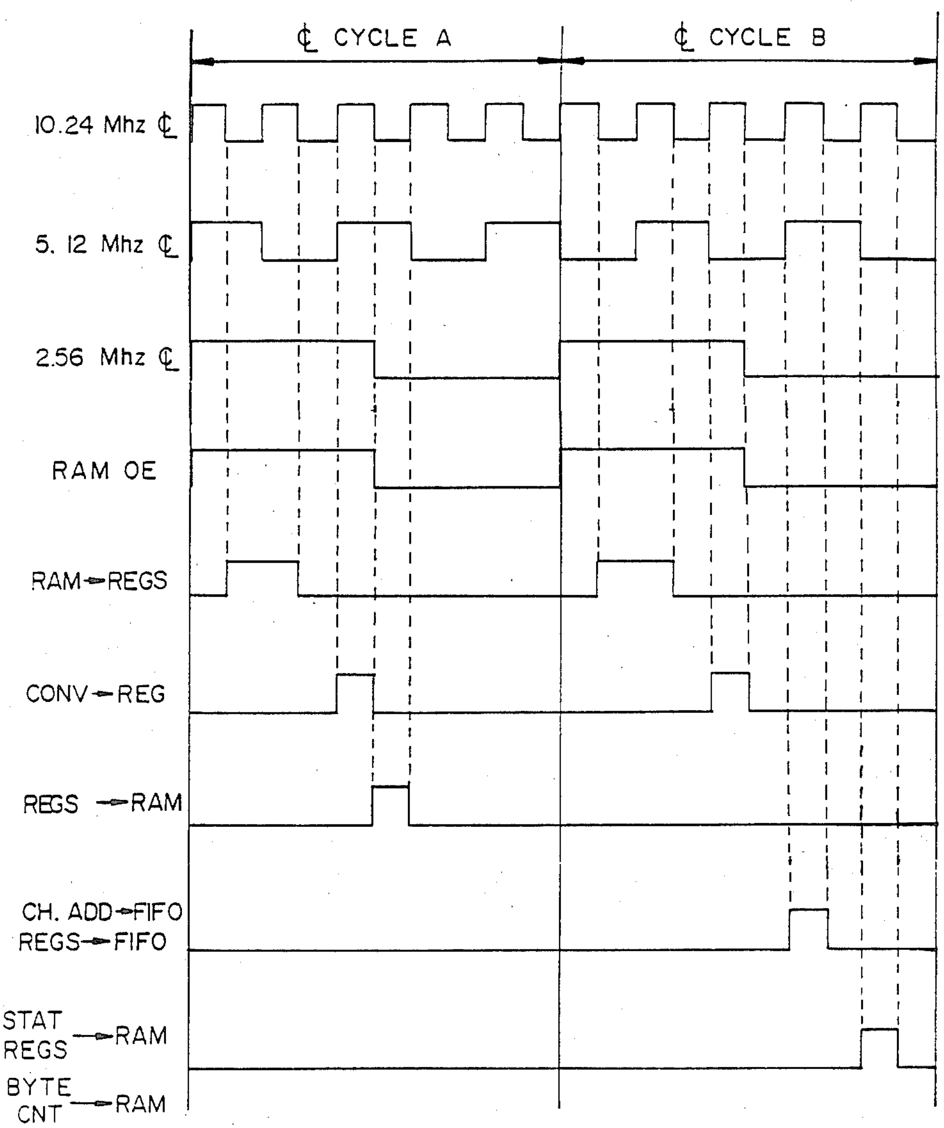
FIG. 4 is a waveform diagram illustrating the function of the circuit of FIG. 3.

The serial output of the shift register 39 is connected to a 4-bit register 41 whose most significant position is connected to the sequencer circuit 32. The register 41, the byte counter 42 and the sequencer circuit 32 essentially comprise the control circuit for the remainder of the circuitry. The 4-bit bus 37 is connected to the decrementing byte counter 42 and static register 43 which serves to provide a source of one bits. Both buses 37 and 38 are also connected to respective FIFOs 44 and 45 adapted to output their content in the conventional manner to a message handler circuit for further processing. The message handler circuit is neither shown or described since it is outside the scope of this invention. Control signals to the various registers, the RAM and the FIFOs are not shown explicitly in FIG. 3; however they can be readily ascertained from FIGS. 3 and 4 and the following description of operation. In FIG. 4, clock cycle A refers to a clock cycle during which bits from a particular channel are being accumulated into a message byte and clock cycle B refers to a clock cycle which is the last (8th) clock cycle of an accumulated byte of data.

The circuit and method of the invention will become clearer from the following description of operation. Generally, the signalling bit stream emerges from output terminal 9 of converter circuit 30 and enters one end of shift register 39 which is one byte long. At each clock cycle of the 2.56 MHz system clock, one bit from the signalling bit line shifts into the end of the shift register 39 and the bit pattern existing in the register 39 shifts to the left. The bits which were previously at the leftmost position in the register 39 pass to the left and into the 4-bit register 41. The bit value at the most significant bit position of register 41 is monitored by the sequencer circuit 32.

During the first portion of each clock period of the 2.56 MHz clock, 12 bits of data associated with a channel are transferred between a corresponding location of the RAM 36 into registers 39 and 41 over respective buses 38 and 37. A new signalling bit is then inserted in the register 39 and the data from the registers 39 and 41 is fed back to the same location in RAM 36. The address which determines where in the RAM the data is stored or extracted is determined by the channel counter 33. The output of this counter is provided on the 9-bit bus 34 and the value of the count ranges from zero up to the binary equivalent of 319 after which it is reset to zero to indicate the beginning of the next frame.

When the system is first turned on, and when it is used to re-initialize the conditions for a specific channel after a message has been received, the data value in the shift registers 39 and 41 is initialized to all ones, under control of the sequencer circuit 32, using the data patterns stored in static registers 40 and 43. If signalling bit data consisting of all ones, representing an idle or no-message condition, is received the pattern of all ones shifting through the shift registers 39 and 41 is indistinguishable from a condition of all ones in the shift registers. The circuit can only emerge from this state when a start-of-message header appears on at least one of the channels.

Let us assume that the circuit is cycling continuously in a no-message condition and that a start-of-message appears on channel 2 of data stream B. That corresponds to address 22 in the RAM 36. The message starts with a zero bit in the signalling bit position in one frame, followed by signalling bits in the corresponding channel of the next three frames indicating the length of the message. Let us further assume that the length of the message is represented by the binary value equivalent to decimal 3 (011). This represents a signalling message consisting of four bytes of data since a zero value represents a message length of one byte.

During each frame time, at the clock count numbered 22, one additional bit from the signalling message will filter into the shift register 39. During that channel time, the contents of the RAM 36 at the corresponding location is read into registers 39 and 41, the new signalling bit is shifted laterally into register 39 and their contents returned to the RAM 36. After four frame times have elapsed, the start bit (zero) and the three length bits have entered the rightmost four bit positions of the bit pattern stored in address 22 of the RAM 36. After four more frame times, the start bit is at the left end of shift register 39 and after 12 frame times, the start bit is at the left end or most significant position of the 4-bit shift register 41, at the position labelled M, at clock count 22. The sequencer circuit 32 recognizes the start bit and causes the following events to occur. The contents of the registers 39 and 41 are written into the FIFOs 45 and 44 respectively instead of into the RAM 36. At the same time, the address value 22 is written into FIFO 35. The four bits in FIFO 44 indicate which byte of the message is available in FIFO 45 and the eight bits in FIFO 45 indicate the data value of that byte of the message. In the example, the byte-count bits are the binary equivalent of decimal 3 indicating that the data byte is the first of four bytes. The data entered in FIFOs 35, 44 and 45 will emerge simultaneously to be fed to a message handler circuit adapted to accumulate the bytes of the signalling message from a specific channel in the proper logical order. The decrementing byte counter 42 is then controlled to decrement a copy of the binary number in register 41, and this decremented value is stored back in the least four significant bits at the appropriate address in the RAM 36. At the same time, the data pattern in static registers 40 and 43, consisting of all binary ones is stored in the eight left bit positions at the same address of the RAM 36.

At this time, the first intelligence byte of the message has been transferred into the FIFO 45 and the binary data at address 22 of the RAM 36 is 1111 11110010. The four bits at the right represent the start bit and the length field now corresponding to the binary number equivalent to decimal 2. The start bit will then shift to the left end of register 41 (position M) after eight frame times. That is the number of frames needed to capture the next byte of the signalling message. At the end of eight frame times, the sequencer circuit 32 recognizes that the next byte of message data is available in register 39 by detecting a zero bit value at position M of register 41. On detection of this condition, the message byte in register 39 is fed to FIFO 45, the byte count is fed to FIFO 44, the channel address is fed to FIFO 35, the byte counter is decremented by one count, and the contents of registers 40 and 43, and that of the byte counter 42 are loaded into the RAM 36 as described above.

On the last byte of a message, the same sequence as described above takes place except that the byte counter 42 is now decremented to all ones (1111) and when the control circuit causes the contents of registers 40 and 43 and byte counter 42 to be stored into the RAM 36 at address 22, that location of RAM 36, corresponding to channel 2 of stream B, will then contain all one bits and will thus be reinitialized in preparation for the next signalling message.

The invention therefore provides a circuit for the demultiplexing of embedded signalling bits from channelized serial data streams which requires a minimum amount of memory space. It will be recognized that various other embodiments of the invention may be realized without departing from the scope and spirit of the invention.

What is claimed is:

1. A demultiplexer circuit for extracting variable length signalling messages embedded in a channelized serial data stream having a frame format comprising a plurality of channels each having a plurality of bits one of which is a signalling bit, the signalling message format comprising a signalling message header having a start bit and a length field defining the number of bytes in the message, the circuit comprising:

a circuit for providing a clock signal for every channel time, a read-write memory having a plurality of locations at least as large as the number of channels in a frame of the serial data stream, each location having at least the number of cells necessary to store a byte of signalling data and the signalling message header, a serial to parallel converter circuit for receiving the serial data stream and responsive to clock signals for sequentially outputting the signalling bits from consecutive channels of the data stream, a first shift register for receiving the signalling bits from the channels of data, for serially outputting a bit for each signalling bit received and for outputting in parallel to the memory a byte of signalling bits, and a control circuit including a second register adapted to receive serial data from the first register and output its content to the memory, the control circuit being responsive to the serial output bits from the first register for recognizing a signalling message header, full bytes of signalling data and the end of a signalling message, the control circuit also including a sequencer circuit responsive to clock signals for providing timing control signals whereby for each signalling bit outputted from the serial to parallel converter, the content of the memory location associated with the channel of that bit is read into the first and second registers, the signalling bit is shifted laterally into the first register and the contents of the first and second registers is written back into the same memory location.

2. A demultiplexer circuit as defined in claim 1 wherein the control circuit is responsive to a full byte of signalling data indication for causing the byte of data in the first register to be read out directly to an output buffer circuit of the demultiplexer circuit and for decrementing the contents of the length field in the memory location associated with the channel of the last bit received in the first register.

3. A demultiplexer circuit as defined in claim 2 wherein the control circuit is responsive to a full byte of signalling data indication from the second register for also causing the address of the channel associated with the last bit received in the first register to be outputted to the output buffer of the demultiplexer circuit.

4. A demultiplexer circuit as defined in claim 3 wherein the control circuit is further responsive to a full byte of signalling data indication for loading the memory location associated with the channel of the last bit received in the first register with a byte of data containing the message header at the four least significant positions and one bits at the other positions of the memory location.

5. A demultiplexer circuit as defined in claim 1 wherein the control circuit is responsive to a full byte of signalling data indication and to an end of message indication for causing the byte of data in the first register to be read out directly to an output buffer circuit of the demultiplexer circuit, and for loading the memory location associated with the channel of the last bit received in the first register with a byte of data containing all one bits.

6. A demultiplexer circuit as defined in claim 5 wherein the control circuit is responsive to a full byte of signalling data indication from the control circuit for also causing the address of the channel associated with the last bit received in the first register to be outputted to the output buffer of the demultiplexer circuit.

7. A demultiplexer circuit as defined in claim 6 wherein the serial to parallel converter is responsive to a plurality of synchronized serial data streams for sequentially outputting the signalling bits from consecutive channels of the data streams and wherein the clock circuit provides clock signals at a rate corresponding to the total number of channels in the data streams.

8. A demultiplexer circuit for extracting variable length signalling messages embedded in a plurality of channelized serial data streams having a frame format comprising a plurality of channels each having a plurality of bits at least one of which is a signalling bit, the signalling message format comprising a signalling message header having a start bit and a length field defining the number of bytes in the message, the circuit comprising:

- a channel counter for providing a clock signal for every channel time;
- means for receiving the serial data streams in synchronism with the channel counter and including circuit means for extracting the signalling bits from the various channels of the data streams and for providing a serial stream of signalling bits;
- a read-write memory having a plurality of locations at least as large as the number of channels in a frame of the serial data streams, each location having at least the number of cells necessary to store a byte of signalling data and the signalling message header;
- a first shift register responsive to clock signals from the channel counter and to the serial stream of signalling bits for serially receiving the signalling bits and serially outputting a bit for each signalling bit received, the first shift register being adapted to output to the memory a byte of signalling bits; and
- a control circuit including a second shift register connected to receive the serial output bits from the first shift register, the control circuit being responsive to the contents of the second register for recognizing a signalling message header, bytes of signalling data contained in the first register and the end of a signalling message, the control circuit also including a sequencer circuit responsive to clock signals for providing timing control signals whereby, for each bit of the serial stream of signalling bits from the extraction circuit means, the content of the memory location associated with the channel of that bit is read into the first and second registers, the signalling bit is shifted laterally into the first register, and the contents of the first and second registers is written back into the same memory location.

9. A demultiplexer circuit as defined in claim 8 wherein the control circuit is responsive to a zero bit at the most significant position of the second register for causing the contents of the first and second registers as well as the count of the channel counter to be read out directly to an output buffer of the demultiplexer circuit and for decrementing the value of the length field in the second register.

10. A demultiplexer circuit as defined in claim 9 wherein the control circuit is further responsive to a zero bit at the most significant position of the second register for loading the memory location associated with the channel of the last bit received in the first register with a byte of data containing the message header at the least four significant positions and one bits at the other positions of the memory location if the decremented length field does not indicate a zero value, and for loading said memory location with a byte of data containing all one bits if the decremented length field indicates a zero value.

11. A method of extracting variable length signalling messages embedded in a channelized serial data stream having a frame format comprising a plurality of channels each having a plurality of bits at least one of which is a signalling bit, the signalling message format comprising a signalling message header having a start bit and a length field defining the number of bytes in the message, the method comprising the steps of:

- extracting the signalling bits from the channelized serial data stream to provide a serial stream of signalling bits in synchronism with a channel clock,
- shifting the serial stream of signalling bits laterally into a shift register adapted to contain one byte of signalling data, Providing a second register for receiving and storing a signalling message header and a read-write memory having a plurality of locations at least as large as the number of channels in a frame of the serial data stream, each location having at least the number of cells necessary to store a byte of signalling data and the signalling message header, and for each channel time of the serial data stream, writing the contents of the memory location associated with that channel into the first and second shift registers, shifting the signalling bit of that channel into the first shift register, and writing the contents of the first and second shift registers back into the memory location associated with that channel.

12. A method of extracting variable length signalling messages as defined in claim 11 comprising the further steps of: at the detection of the start bit in the most significant bit in the second shift register causing the content of the first and second shift registers to be written into an output buffer along with the associated channel address, decrementing the value of the length field in the second register and writing a byte of data having a predetermined bit pattern in the location of memory corresponding to the same channel address.

13. A method of extracting variable length signalling messages as defined in claim 12 wherein the data written into the memory location at the boundary of a byte of signalling data that is internal to the signalling message comprises the message header at the least significant positions and one bits at the other positions of the memory location thereby allowing the recognition of the next byte boundary of the message by the detection of the start bit of the message header at the most significant position of the second shift register.

14. A method of extracting variable length signalling messages as defined in claim 13 wherein the data written into the memory location at the end of the last byte of signalling data in a message comprises all one bits thereby re-initializing the channel memory location for the next message.

* * * * *